H. R. E. KUMMER.
VAPOR REGULATOR GAUGE.
APPLICATION FILED NOV. 18, 1918.
1,412,787. Patented Apr. 11, 1922.
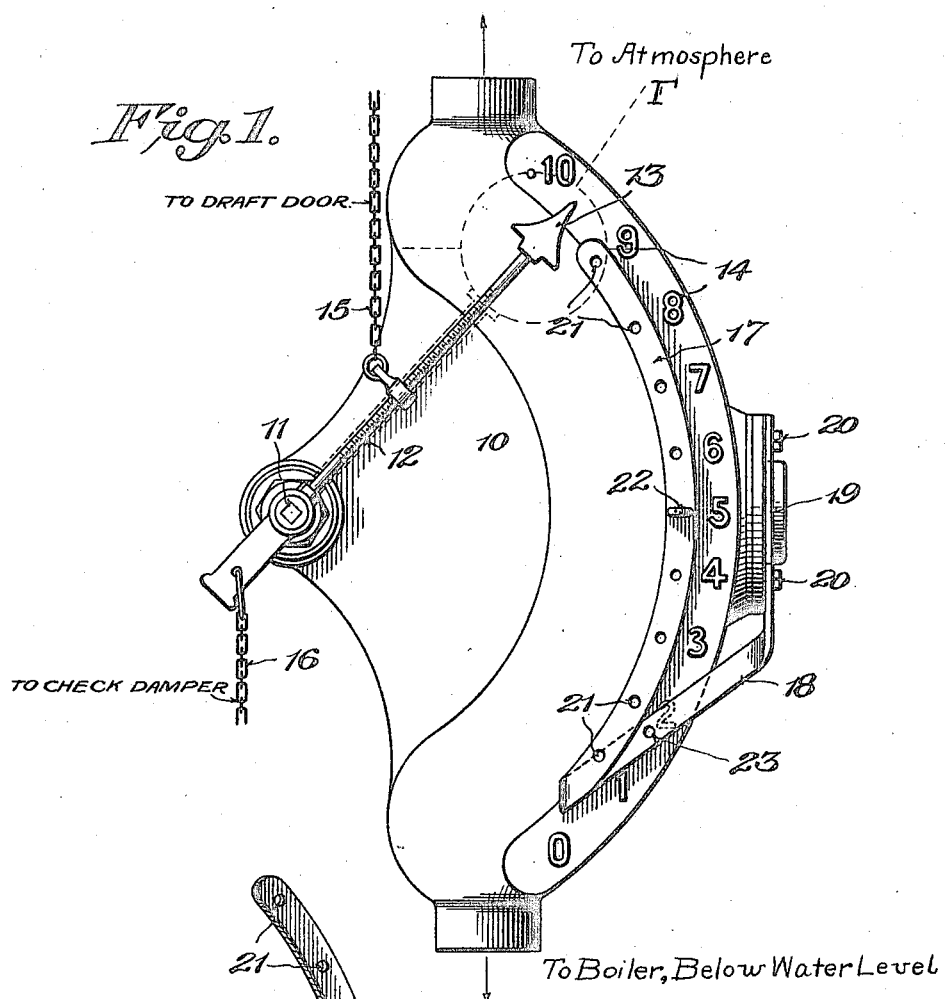
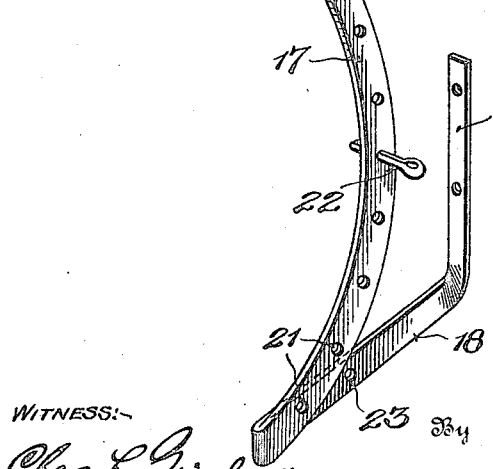

UNITED STATES PATENT OFFICE.

HENRY R. E. KUMMER, OF DARLINGTON, WISCONSIN.

VAPOR-REGULATOR GAUGE.

1,412,787.  Specification of Letters Patent.  Patented Apr. 11, 1922.

Application filed November 18, 1918. Serial No. 263,067.

*To all whom it may concern:*

Be it known that I, HENRY R. E. KUMMER, a citizen of the United States, and residing at Darlington, county of Lafayette, and State of Wisconsin, have invented certain new and useful Improvements in Vapor-Regulator Gauges, of which the following is a specification.

The present invention relates to vapor regulators and more particularly to an improvement in regulators of the type described in the patent to Peck and Cleland, No. 990,769, granted April 25, 1911. Such regulators are designed to maintain a substantially constant vapor pressure in the boiler. Thus if the regulator is set to give a pressure of five ounces, both the draft door and check damper are closed at this pressure, but should the pressure fall from this amount then the draft door is opened, thus causing an increased combustion of the fuel and thereby raising the pressure in the boiler. If the pressure should rise, the reverse occurs, and the check damper is opened. During the night and warm spells it is not necessary, nor desirable, to maintain the usual pressure. To this end the present invention comprehends the provision of means for rendering the regulator inoperative if the pressure falls below a certain selected amount, but permits its operation if the pressure rises above the said amount.

The objects and features of novelty will be apparent from the description taken in connection with the drawings in which:—

Figure 1 is a side elevation of a vapor regulator of the type described in the aforementioned patent and equipped with the improvement according to the present invention; and Figure 2 is a perspective view of the attachment adapted to be applied to the regulator in accordance with this invention.

Referring to the drawings the vapor regulator with which the present invention is shown comprises a casing 10 having a shaft 11 extending therethrough, this shaft being turned to correspond with the pressure within the boiler by a float F disposed within the casing. An arm 12 is secured to the shaft 11 on the exterior of the casing, and one end 13 thereof is positioned to swing over the numerals 14 which are disposed in connection with the arm to indicate the pressure within the boiler. A chain 15 is adjustably secured to the arm between the shaft 11 and point 13 and extends to and operates the draft door of the boiler. A similar chain 16 is connected to the arm 12 on the opposite side of the shaft 11 and extends to the check damper.

If the regulator is set to maintain a pressure of five ounces for example, then when the point at 13 is opposite the numeral 5, the draft door and check damper are both closed the length of the chains being such that these conditions obtain for the selected pressure. If the pressure in the boiler should rise then the arm 12 would turn in a counterclockwise direction. This movement does not affect the draft door, but it does open the check damper with the result that the rate of combustion of the fuel decreases and subsequently the pressure in the boiler falls. On the other hand, if the pressure in the boiler should drop below the desired amount of five ounces then the arm 12 would swing in a clockwise direction thereby through the chain 15 opening the draft door, but not affecting the check damper. Opening the door of course causes an increased combustion of the fire and an answering rise in the boiler pressure. The structure and operation just described are the same as disclosed in the said Patent Number 990,769.

During the night and warm spells it is not necessary, nor desirable, to maintain the usual pressure, say five ounces, and yet the pressure must not be allowed to rise above this amount. According to the present invention means is provided for rendering the regulator inoperative when the pressure falls below the said amount, but permits its operation if the pressure rises above the same. For this purpose an attachment is provided which comprises the arcuate bar 17 having an angular piece consisting of legs 18 and 19 secured to one end thereof. The form of this attachment is such that the leg 19 may be secured to the regulator by the bolts 20 thereof to position the arcuate bar 17 against one side of the casing 10 and adjacent the pressure numerals so that the bar 17 is just inside of the path of movement of the point 13 of the arm 12. This bar is provided with a plurality of apertures 21, an aperture being preferably positioned opposite each numeral on the casing. A pin 22 is adapted to be placed in any one of the apertures 21, in which case it will act as a stop to prevent movement of the arm 12 in one direction. When the pin is not in use for this purpose it may be placed in the aperture 23 in the leg 18.

It will be observed, if the pin 22 is positioned in the aperture opposite the numeral 5, the arm 12 will be prevented from moving downward below this position. In consequence, if the pressure in the boiler falls below five ounces the arm cannot move in the direction to operate the draft door to open the same. Hence, the regulator is rendered inoperative below the pressure of five ounces. On the other hand, if the pressure rises above five ounces, the check damper will be opened, thus effecting a reduction of the boiler pressure. It will be seen, therefore, that the fire may be banked during the night as the regulator is rendered inoperative below the pressure determined by the position of the pin 22. Thus a considerable saving in fuel is effected. Furthermore, if it is desired to bank the fire, as when using hard coal, and it is desired to have the check damper open, this is easily accomplished by setting the pin 22 in any one of the apertures 21 above the usual regulator pressure.

Although the invention has been described as embodied in an attachment adapted to be applied to a regulator, it is obvious that it might be carried out in other ways, and it is to be understood that the invention is not limited to the exact details described but includes changes and modifications which come within the scope of the appended claims.

Having thus described the invention what is claimed as new and desired to be secured by Letters Patent is:—

1. A vapor pressure regulator comprising in combination, a casing having an opening adapted to be connected to a boiler, a member within the casing movable in response to pressure variations in the boiler, an arm pivoted on the outside of the casing and connected with said member, the arm being adapted for adjustable connection with the draft door of the boiler and to the check damper thereof, and means for selectively preventing increase of the draft comprising a stop adapted to be placed in any of a series of positions in the path of the arm.

2. A vapor pressure regulator comprising in combination a casing having an opening adapted to be connected to a boiler, a member within the casing, movable in response to pressure variations in the boiler, an arm pivoted at the outside of the casing and rigidly connected with said member, the arm being adapted for adjustable connection to the draft door of the boiler and to the check damper thereof and means for selectively preventing increase of the draft comprising a detachable member mounted on the casing adjacent to the path of travel of said arm and a stop adapted to be placed in any of a series of positions on said detachable member.

In testimony whereof I affix my signature.

HENRY R. E. KUMMER.